United States Patent [19]
Trevelyan et al.

[11] Patent Number: 4,862,759
[45] Date of Patent: Sep. 5, 1989

[54] WRIST MECHANISM FOR ROBOTIC MANIPULATIONS

[75] Inventors: James P. Trevelyan, Nedlands; David Elford, Mount Hawthorn; Michael C. H. Ong, Nedlands; Peter D. Kovesi, Shenton Park, all of Australia

[73] Assignee: The University of Western Australia, Nedlands, Australia

[21] Appl. No.: 159,099

[22] Filed: Feb. 23, 1988

[30] Foreign Application Priority Data

Feb. 23, 1987 [AU] Australia ................... PI0513

[51] Int. Cl.⁴ .................................................. F16H 1/20
[52] U.S. Cl. .................................... 74/417; 901/26; 901/29; 74/479
[58] Field of Search ............... 74/479, 417, 665 C, 74/665 A; 901/26, 29, 25

[56] References Cited

U.S. PATENT DOCUMENTS

| 4,353,677 | 10/1982 | Susnjara et al. | 414/735 |
| 4,568,311 | 2/1986 | Miyake | 901/26 X |
| 4,606,695 | 8/1986 | Lenz | 74/665 A X |

FOREIGN PATENT DOCUMENTS

| 3206484 | 2/1985 | Australia . |
| 8195687 | 6/1988 | Australia . |
| WO87/04539 | 7/1987 | World Int. Prop. O. . |

Primary Examiner—Leslie A. Braun
Assistant Examiner—Janice Chartoff
Attorney, Agent, or Firm—Cushman, Darby & Cushman

[57] ABSTRACT

A wrist mechanism suitable for robotic manipulators comprising a first actuator for rotating a first yoke about a first axis, a first crossed shaft carried by the yoke, a second actuator for pivoting the first crossed shaft about a second axis, a second crossed shaft carrying a second yoke, an actuator means for causing rotation of the wrist mechanism about a third axis, highly rigid side plates supporting the first and second crossed shafts in bearings, highly rigid cross members rigidly interconnecting the side plates, and gears for transferring motion between the first and second crossed shafts to allow pivotal movement of an end effector carried by the second yoke in excess of 180° about the second axis, and at least 180° about the third axis, and rotation in excess of 200° about the first axis.

8 Claims, 11 Drawing Sheets

WRIST MECHANISM FOR ROBOTIC MANIPULATIONS

FIELD OF THE INVENTION

This invention relates to a wrist mechanism which is particularly suitable for use in robotic manipulators, for example, in the automated shearing of sheep.

BACKGROUND OF THE INVENTION

Robot wrist mechanisms are carried at the end of mechanical arms of robotic manipulators, which are used to position and move parts and tools, generally termed end effectors.

In most robot manipulators so far proposed, the end effector is mounted on the wrist mechanism which consists of a series of links each of which can pivot about an axis mounted on the next link so that the end effector can be turned about any or all of three different, usually orthogonal, directional axes.

In a first known form of wrist, each successive link carries an axis at 90° to its own axis. In a second form of wrist, each successive link carries an axis at 60° (or thereabouts) to its own axis. To a greater or lesser extent, both types of mechanism exhibit degenerate positions in which the three axes of rotation become co-planar. In these positions, the end effector can only be turned freely about two directional axes instead of the usual three. A particular feature of these mechanisms is that when the wrist links are close to a degenerate position, that is, when the axes are nearly coplanar, the rate at which the end effector can be rotated is restricted because the rate of rotation of the wrist axes required to obtain end effector rotation is much greater is such a position than in other positions. Thus, there exists a zone about each degenerate position, usually called a "singularity zone", in which one or more of the rotary motions of the end effector is restricted in speed to a much greater extent than in other positions of the wrist mechanism.

If one were to show the range of orientation movement of the wrist on a sphere, one would find zones of degeneracy or singularity zones in which part of the end effector motion is restricted. Most wrist mechanisms so far proposed exhibit one or more singularity zones as described within the range of orientation movement permitted by mechanical limitations. Thus singularity zones further restrict the usefulness of a wrist mechanism.

A practical wrist mechanism will also be restricted in the extent to which each rotation can occur because of the impossibility of passing mechanical parts through one another, and the need to provide a degree of strength and stiffness in the mechanism and thereby increasing the size of supporting members.

A further requirement of a practical wrist is that the hydraulic and electrical service and signal lines (or umbilicals) for the end effector must be positioned so as not to interfere with the actuation of the wrist and not to become tangled when the wrist is manipulated through its full range of angular movements. While it is sometimes possible to carry the umbilicals through the wrist axes, where the end effector has substantial power and feedback signal requirements, as in the case of an automated sheep shearing mechanism, this will not be achievable without compromising the size, mass and dexterity of the wrist. Thus in many wrist applications, the end effector services must be carried by an external umbilical system which itself must remain under control when subjected to high dynamic forces and must also be excluded from the work space.

SUMMARY OF THE INVENTION:

The invention therefore provides a wrist mechanism suitable for robotic manipulators comprising first actuator means for rotating a first yoke about a first axis (W1), a first cross shaft, one shaft of which is mounted for rotation in bearings carried by arms of said first yoke, the other shaft of which has its ends mounted in bearings carried by a pair of spaced parallel side plates, second actuator means for pivoting said first cross shaft in said bearings about a second axis (W2), a second cross shaft having one shaft mounted in bearings carried by said side plates, the other shaft of which pivotally carries a second yoke adapted to carry an end effector, actuator means for causing rotation of said wrist mechanism about a third axis (W3) coincident with the axis of said other shaft of said first cross shaft, cross members rigidly interconnecting said side plates, and gear means for transferring motion between said first cross shaft and said second cross shaft and for transmitting drive between said first yoke and said second yoke, said side plates, said cross members, said bearings and said gears being constructed and adjusted to provide high rigidity in said wrist mechanism, said side plates and said cross members being of such a configuration to allow pivotal movements of the end effector in excess of 180° about said second axis and at least 180° about said third axis, said first actuator being constructed to allow rotation in excess of 200° about said first axis.

It will be appreciated that in a wrist mechanism of the above construction, the work space in which the end effector is required to operate is large and substantially free of singularity zones. In fact the wrist mechanism has a single cone shaped singularity zone which is directed upwardly and therefore does not encroach on the work space of the end at all.

In a preferred form of the invention, service and signal lines extend from one face of said first yoke and enter a face of said end effector displaced by 90° to said face of said yoke. In this way, the service and signal lines do not become entangled and do not encroach on the work space of the end effector.

The spaced parallel side plates preferably comprise one very rigid bearing carrying side plate and a lighter bearing carrying side plate interconnected by two intermediate cross members and a lower cross member shaped to allow free passage of the gears throughout the full range of motion of the wrist mechanism and also to accommodate the third actuation means (W3) between the side plates within the mechanism. To further increase the rigidity of the wrist mechanism, the main load carrying gears are mounted on substantial bearing assemblies carried by bearing holders formed integrally with the very rigid side plate. The meshing of the bevel gears is adjusted by means of machined washers to reduce the amount of backlash to a minimum thereby further improving the rigidity of the mechanism.

The actuators are preferably hydraulic actuators and to reduce compliance caused by free hydraulic fluid carried by lines to the actuators, servo valves are preferably directly mounted on the actuators whereby the volume of hydraulic fluid carried by the system is reduced to a minimum. The actuator for the W3 movement is preferably carried inside the wrist mechanism thereby reducing the overall dimensions of the wrist mechanism.

The first yoke preferably includes a main pivot arm to which a first bevel pinion is rigidly attached and through which a cross shaft is mounted in bearings, said cross shaft being rigidly mounted in an opening in an upper pivot shaft mounted in said bearings carried by said bearing holder of said main side plate and in bearings in said auxiliary side plate, a second bevel gear meshing with said first bevel gear and carried by bearings engaging the external surface of said bearing holder, said second bevel gear also carrying a first segment gear extending adjacent and parallel to the main side plate, a second segment gear meshing with said first segment gear and carried by a third bevel gear mounted on bearings engaging the outer surface of the other bearing holder formed integrally with said main side plate, a lower pivot shaft carried by the bearings in said bearing holder and in said auxiliary side plate, a stub axle rigidly carried in an opening in said lower pivot shaft and extending perpendicularly thereto, said stub axle carrying a bevel gear which meshes with the lower bevel gear, third and fourth segment gears carried by said upper and lower pivot shafts and extending parallel to said auxiliary side plate, said second actuator means being mounted on first yoke and engaging pivot means attached to said upper pivot shaft to pivot said wrist mechanism about an axis coincident with said cross shaft, said third actuator extending between said lower cross member and pivot means on said upper pivot shaft to pivot said wrist mechanism about an axis coincident with said upper pivot shaft, said second yoke being rigidly attached to said fourth bevel gear.

BRIEF DESCRIPTION OF THE DRAWINGS:

In order that the invention may be more readily understood, an embodiment of the invention which is presently preferred will now be described with reference to the accompanying drawings.

DESCRIPTION OF PREFERRED EMBODIMENT:

The wrist mechanism embodying the invention will be described in relation to a device for positioning and moving a shearing device in the automated shearing of sheep. However, it will be clear that the wrist mechanism to be described could be used in many applications, such as the angular positioning of radar scanners, or in many other robotic applications where kinematic dexterity and the absence of singularity zones in the working space is required.

Referring to FIGS. 1 to 4 of the drawings, the principles of the wrist mechanism will first be described. The wrist mechanism 10 will be seen to be connected to a rotary hydraulic actuator 12 FIG. 4 for rotation at joint 14 about axis W1. This rotation is one of the three rotations of the wrist mechanism 10, which result in three different orientation changes of the end effector or follower, such as a cutter mechanism for shearing sheep, at attachment point 16.

Figure 1:
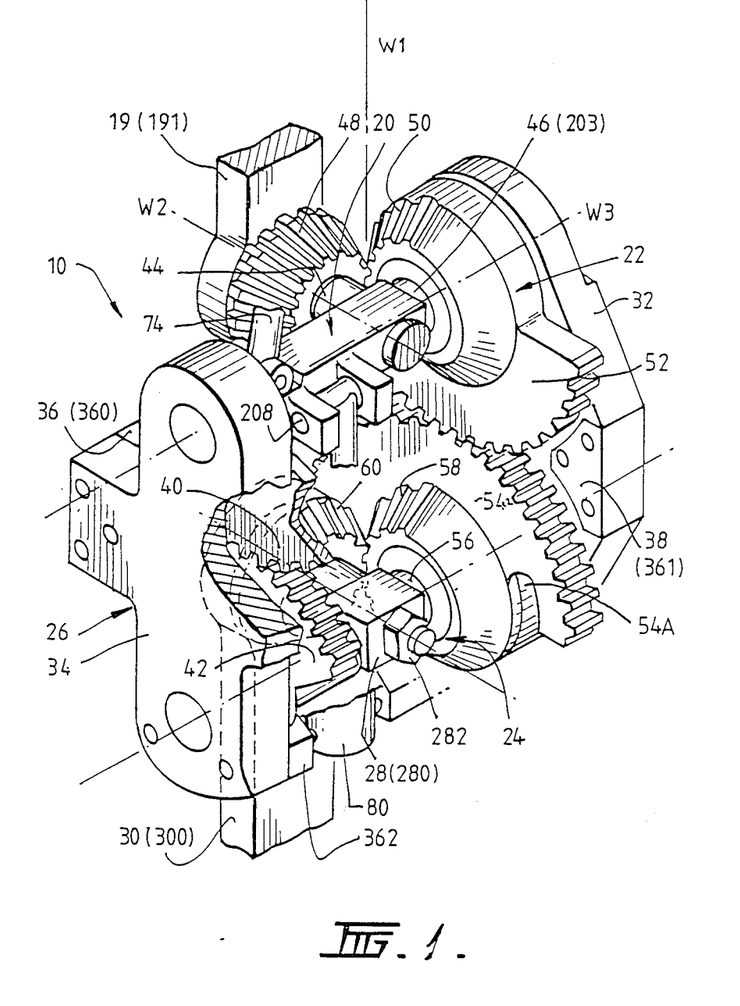
FIG. 1 is a partly cut-away simplified perspective view showing the principle of the wrist mechanism embodying the invention.

An output shaft 18 extending from joint 14 carries a yoke assembly 19 in which is pivoted a crossed-shaft assembly 20 forming the first of two Hooke joints.

The wrist mechanism 10 basically consists of two universal Hooke's joints 22 and 24 connected to one another by a short rigid link 26. The motions of the two joints are synchronized to one another by means of gears, to be described below.

Pivoted in the bottom of the link 26 is another crossed-shaft assembly 28 of the lower Hooke joint 24. The end effector is attached to the lower yoke 30 of the second Hooke joint 24 at the attachment point 16. The lower yoke 30 is pivoted to the crossed-shaft 28 of the second joint 24. The link 26, as shown in FIG. 1, consists of side plates 32 and 34 connected by the shafts 20 and 28 and by rigid cross members 36 and 38 (shown only schematically in FIG. 1). The shaft 44 of crossed-shafts 20 constitutes axis W2 and the shaft 46 constitutes axis W3 and rotation about these axes is achieved by hydraulic actuators discussed further below, one engaging the shaft 46 to rotate shaft 44 about axis W2, and the other engaging shaft 44 to rotate shaft 46 about axis W3.

Rotation about the W3 axis is distributed equally to the upper and lower Hooke joints 22 and 24 by the following gear train A segment gear 40 is rigidly attached to the crossed-shafts 20 of the upper joint 22 and meshes with a similar segment gear 42 rigidly attached to the crossed-shaft 28 of the lower joint 24. Thus, rotation of the link 26 about the crossed-shafts 20 results in a similar rotation of the yoke 30 relative to the link 26. The change in rotation of the yoke 30 relative to the arm 12 is therefore exactly twice that of link 26.

Rotation about the W2 axis is distributed equally to the upper and lower Hooke joints 22 and 24 by means of the following gear train.

Figure 2:
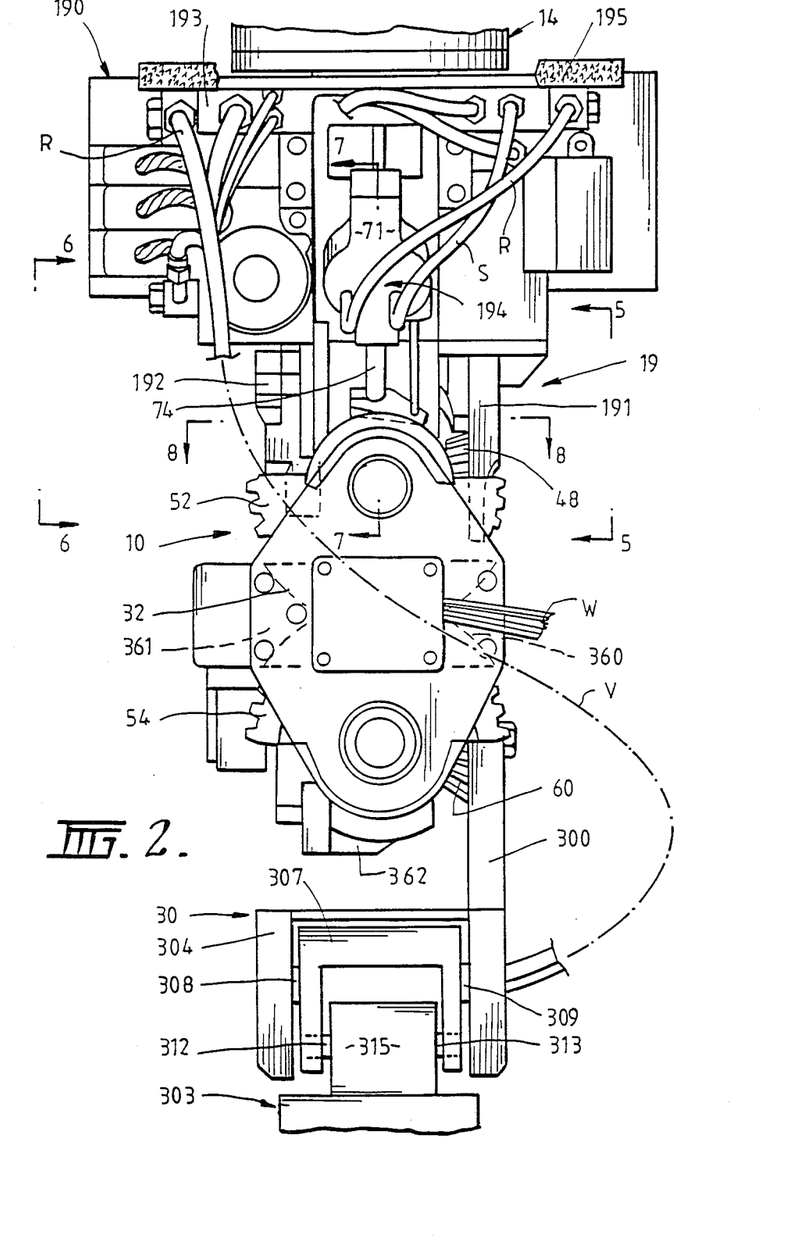
FIG. 2 is a partly sectional, partly fragmentary side elevation of a wrist mechanism according to a presently preferred embodiment of the invention.
Figure 3:
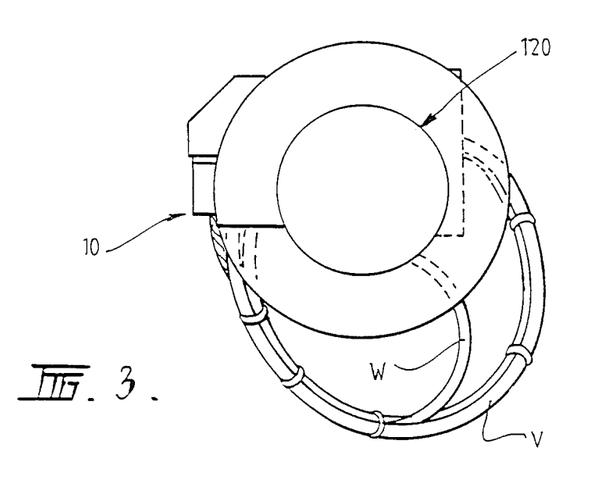
FIG. 3 is a plan view of the wrist showing the disposition of the "umbilicals"

A bevel gear 48 is rigidly attached to the upper yoke 19 and meshes with a bevel gear 50 to which is rigidly connected a segment gear 52, and which is free to rotate about shaft 46 (axis W3) of the crossed-shaft 20, to which the link 26 is pivotally connected. The segment gear 52 meshes with a similar segment gear 54 which rotates about shaft 56 of the crossed-shaft 28, which is pivotally connected to the link 26. This second segment gear 54 is rigidly connected to a bevel gear 58 which meshes with a bevel gear 60 which is rigidly attached to the lower yoke 30. Thus, rotation of the arm 44 of crossed shafts 20 in the upper yoke 19 (around axis W2)

causes the bevel gear 50, and the attached segment gear 52, to rotate about the shaft 46. Assuming, for a moment, that there is no rotation about the W3 axis, the rotation of the segment gear 52 relative to the link 26 causes a similar but opposite rotation of the segment gear 54 relative to the link 26. The bevel gear 58 is attached to segment gear 54 and engages with the bevel gear 60 rigidly attached to the output yoke 30. The relative sizes of the bevel gears 48, 50, 58 and 60 and of the segment gears 52 and 54, are arranged such that the resulting rotation of the bevel gear 60 about the shaft 28 is identically equal to the rotation about the axis W2. When the mechanism is in its central position as shown in FIG. 2 the resulting rotation of the output yoke 30 is twice the rotation of the shaft 44 about the W2 axis.

In the case of a rotation of the crossed-shaft assembly 20 about the W3 axis, with no rotation about the W2 axis, the bevel gear 50 with the segment gear 52 attached remains static relative to the yoke 19 but moves relative to the plate 32. Segment gear 54 and the bevel gear 8 attached to it, therefore rotate an equal amount in the opposite direction relative to plate 32. However, at the same time, as described in the preceding paragraph, the segment gear 42 has rotated relative to plate 34 to exactly the same extent causing the crossed-shafts 28 to rotate through the same angle as the segment gear 52 and the bevel gear 58. Therefore, in this instance, there is no relative rotation of the bevel gear 60 and the yoke 30 attached to it about the shaft 28. In the above described way, the wrist mechanism may be driven about either or both of its two rotational directions with half of the rotation in each direction being distributed to each Hooke joint 22 and 24. By arranging the sizes of the gears in the mechanism differently, the distribution of motion to the two Hooke joints 22 and 24 may be changed if the application requires such a variation.

The presently preferred embodiment of the wrist mechanism will now be more fully described with reference to FIGS. 1 to 18 of the accompanying drawings.

Figure 4:
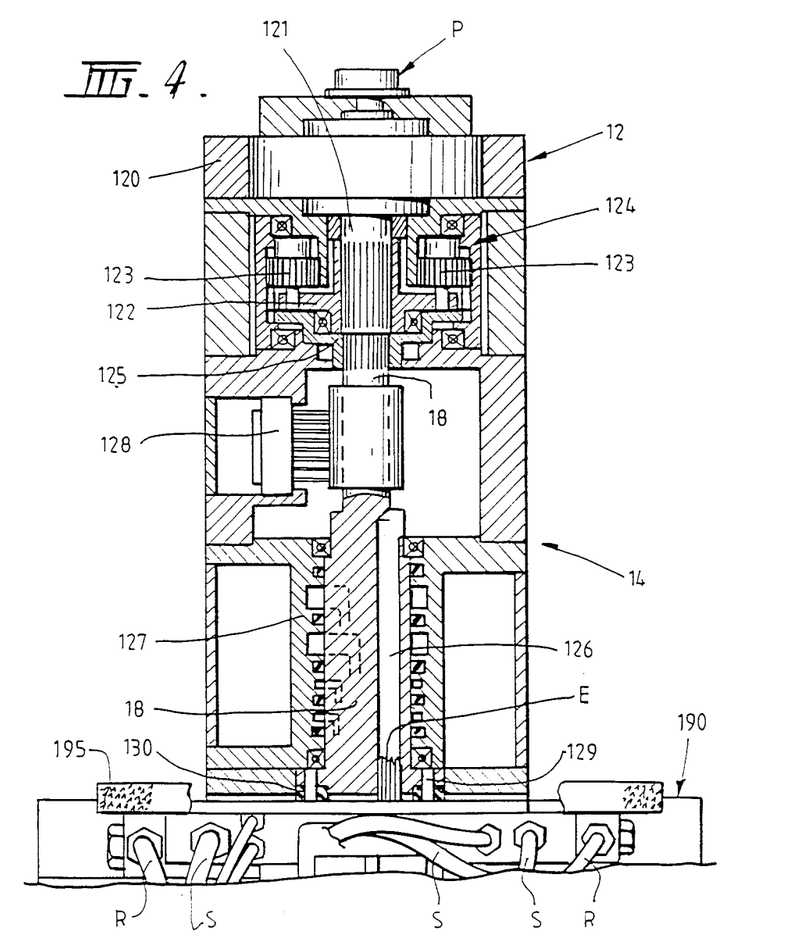
FIG. 4 is a sectional elevation of the hydraulic actuator mechanism for rotating the wrist mechanism about its W1 axis.

Referring firstly to FIG. 4 of the drawings, the W1 actuator 12,14 will be seen to comprise a 270° rotary hydraulic actuator 120 having an output shaft 121 which is splined to a ring cage 122 carrying pinions 123 of a 270° to 440° epicyclic gear box 124. A potentiometer P senses the rotary position of the actuator 120. The output member 125 of the epicyclic gear box 124 is splined to the output shaft 18 of the W1 actuator. The output shaft 18 is formed with hydraulic services bores (not shown) and an electrical services bore 126 and is surrounded by a rotary hydraulic coupling 127. An electronic slip ring assembly 128 transfers electrical supply to the electrical services lines E in the bore 126 as the actuator 120 rotates the output shaft 18 through its 440° of travel.

The yoke assembly 19 of the wrist mechanism 10 is bolted to the lower flange 129 of the output shaft 18 with an insulating spacer 130 interposed therebetween.

Referring now to FIGS. 2 to 6 of the drawings, the yoke assembly 19 will be seen to comprise a support structure 190 to which main and auxiliary pivot arms 191 and 192 respectively are rigidly attached. The support structure 190 carries an hydraulic supply and return manifold 193 to which hydraulic supply and return lines S and R are connected. Two of the hydraulic supply and return lines extend, along with the electrical services lines E to the follower assembly F attached to the wrist mechanism 10. As mentioned above, the supply and services lines, or umbilicals V, extend from one face of the yoke assembly 19 (out of the plane of FIG. 2) and extend around the wrist assembly 10 through 90° to enter the face of the end effector or follower assembly which is at right angles to the plane of FIG. 3 and which supports the lower yoke 30. The arrangement is shown further in the plan view of FIG. 3 and it will be noted that electrical wiring W to the W3 actuator enters the wrist centrally. With this simple arrangement of umbilicals it has been found that the wrist mechanism may be moved throughout the full range of its movements without tangling the umbilicals or having them substantially interfere with the working space.

The support structure 190 also supports an hydraulic actuator 194 for pivoting the wrist mechanism 10 about its W2 axis. A support strip 195 having hooked fibers of the type sold under the brand VELCRO is provided for the attachment of a cover (not shown) for the wrist mechanism 10 bearing a complementing strip having engageable hooked fibers.

Figure 5:
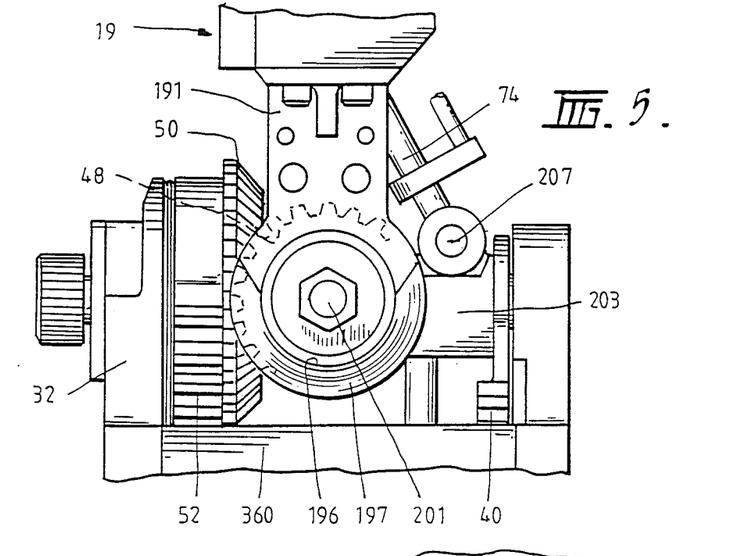
FIGS. 5 to 7 are side elevations and a sectional elevation of the main yoke assembly of the wrist assembly taken along the lines 5—5, 6—6 and 7—7 of FIG. 2.
Figure 6:
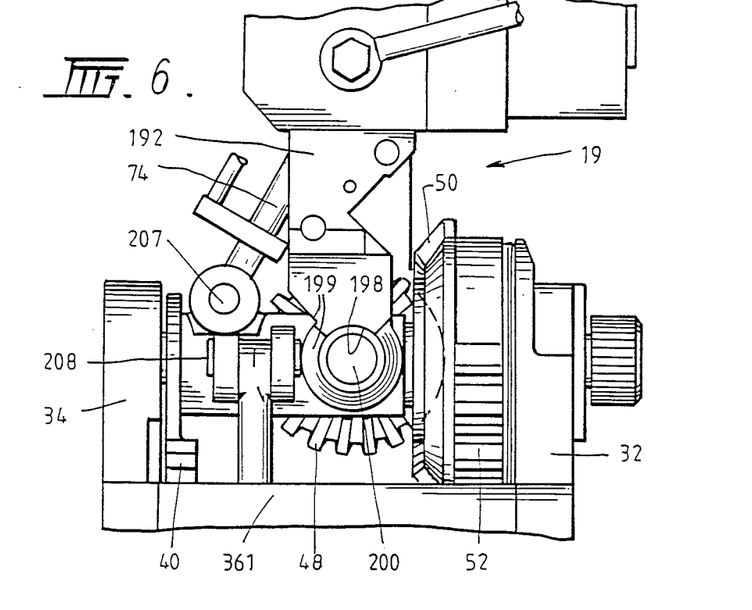

It will be noted from FIGS. 4, 5 and 6 that the main pivot arm 191 includes an opening 196 which rigidly supports gear 48 which in turn provides a bearing support. The pivot arm 191 is machined at 197 to allow the wrist mechanism 10 to pivot to one of its kinematic extremities. Similarly, the auxiliary pivot arm 192 has a bearing opening 198 and is machined at 199 to accommodate the top segment gear 52 when the wrist mechanism 10 is at one of its kinematic extremities.

Figure 8:
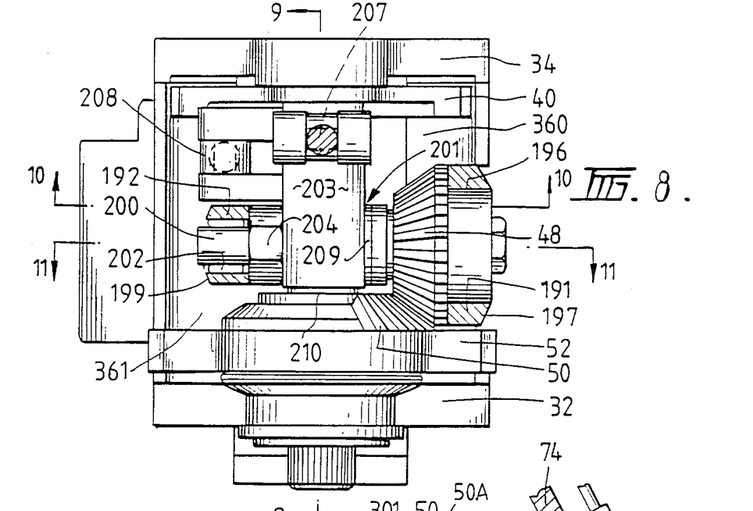
FIGS. 8, 9, 10 and 11 are sectional views of the wrist mechanism for achieving rotation of the wrist about its W2 and W3 axes and taken along the lines 8—8 in FIG. 2, 9—9, 10—10 and 11—11 in FIG. 8.
Figure 9:
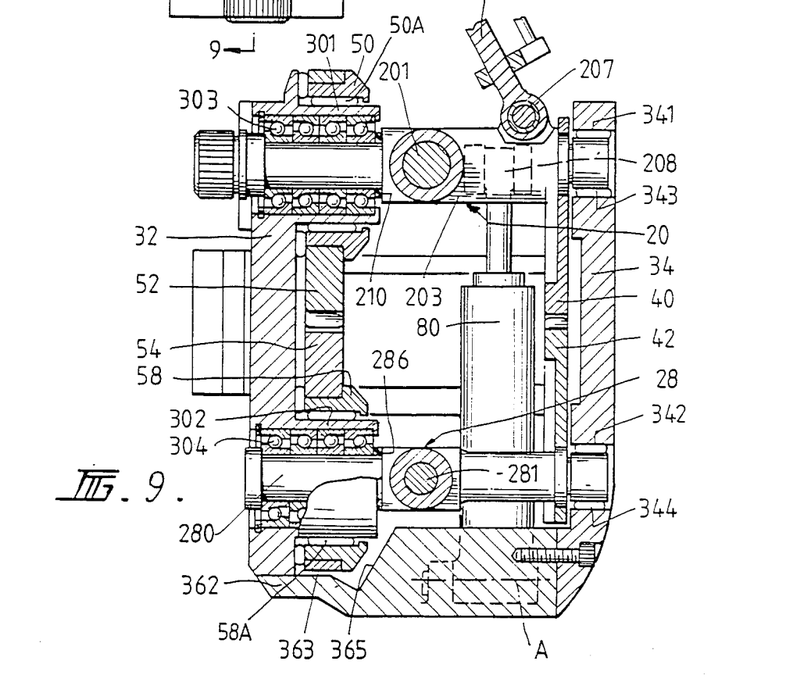
Figures 10, 11:
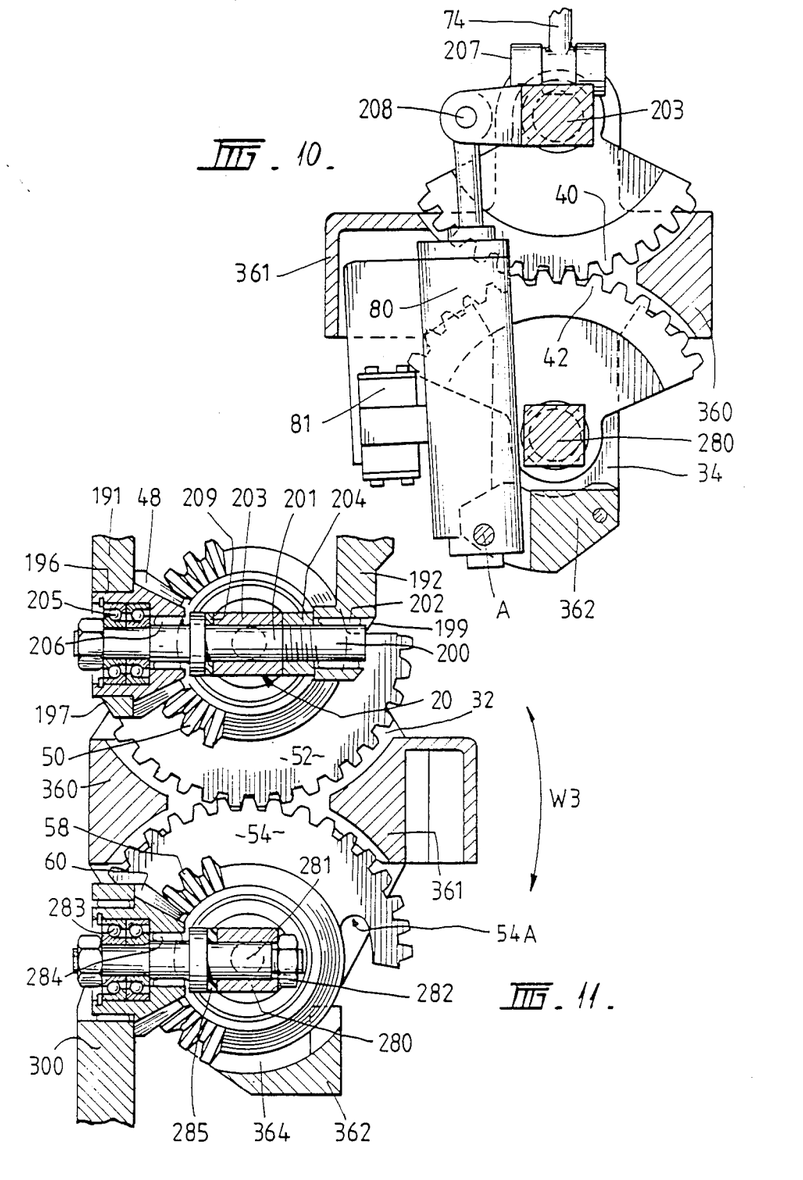

Referring to FIG. 8, the bearing opening 196 in the main pivot arm 191 is engaged by the top bevel gear 48 and is bonded in position so as to be rigid with the arm 191. The auxiliary pivot arm 192 engages needle roller bearings 202 on an axle portioned 200 formed on a cross shaft 201 secured to an upper pivot shaft 203 by a retaining nut 204, to provide the crossed-shaft assembly 20. Referring to FIG. 11, cross shaft 201 is supported within the bevel gear 48 by means of angular contact bearings 205 and needle roller bearings 206. Spacer washers 209 and 210 are ground to an appropriate thickness during assembly of the wrist mechanism to minimize the backlash between the bevel gears 48 and 50. The crossed-shaft assembly 20 also has hydraulic actuator pivot pins 207 and 208 to which the hydraulic actuator 194 (W2) and the hydraulic actuator 80 for W3 movement are attached as shown in FIGS. 9 and 10.

Figure 12:
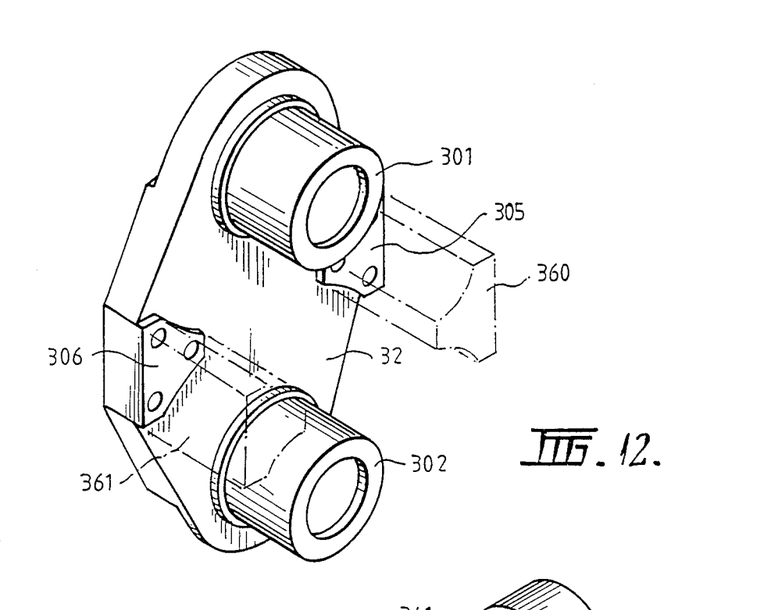
FIGS. 12 and 13 are perspective views of the main and auxiliary side plates of the wrist mechanism.
Figure 13:
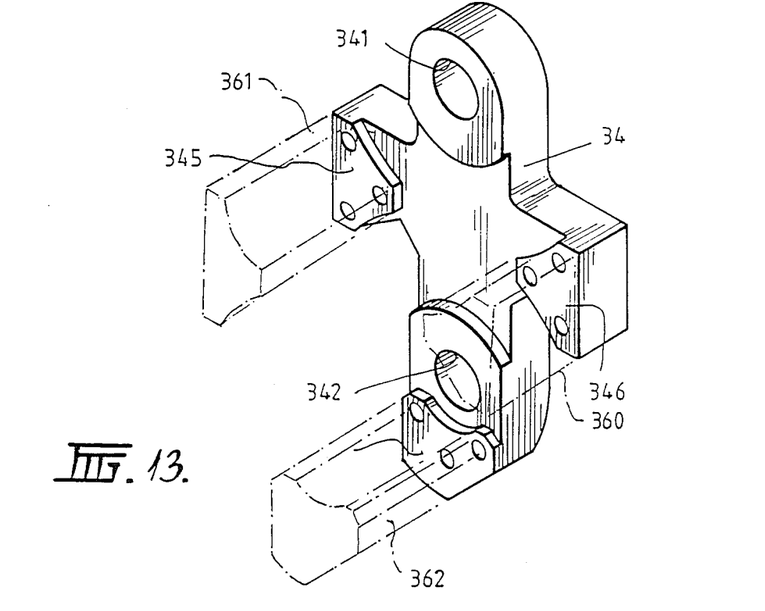

The upper pivot shaft 203 is rotatably supported between the main side plate 32 and the auxiliary side plate 34. Reference to FIG. 12 will show that the main side plate 32 is considerably more rigid than the auxiliary side plate 34 (FIG. 13) and includes cylindrical bearing supports 301 and 302, each of which house sets 303 and 304 (FIG. 9) of four angular contact bearings for rotatably supporting the upper pivot shaft 203 of the upper crossed-shaft assembly 20 and the lower pivot shaft 280 of the lower crossed-shaft assembly 28. The bearing supports 301,302 also rotatably support upper and lower bevel gears 50 and 58 via needle roller bearings 50A and 58A respectively. Once again, spacer washers 285,286 ground to the appropriate thickness are used to control backlash. Meshing segment gears 52 and 54 are in turn rigidly attached to the bevel gears 50 and 58 and are arranged adjacent the main side plate 32.

The auxiliary side plate 34 (FIG. 13) is lighter in construction than the main side plate 32 since only radial loads are required to be carried by this side plate. The auxiliary side plate 34 includes bearing openings 341 and 342 which rotatably support the opposite ends of the upper and lower pivot shafts 203 and 280 via needle roller bearings 343 and 344 (FIG. 9). Meshing segment gears 40 and 42 are rigidly attached to the shafts 203 and 280 respectively adjacent the inner face of the side plate 34. A stub axle 281 (FIG. 9 or 11) is secured to the lower pivot shaft 280 by a retaining nut 282 (FIG. 11). A bevel gear 60, which meshes with the bevel gear 58, is rotatably supported by the stub axle 281 via angular contact bearings 283 and needle roller bearings 284.

The main side plate 32 and the auxiliary side plate 34 are also interconnected by intermediate cross members 360 and 361 and by a lower cross member 362. As shown most clearly in FIGS. 2, 10, 11, 12 and 13, the intermediate cross members 360 and 361 are bolted to the side plates 32 and 34, being supported between land portions 305 and 306 and 345 and 346 respectively. The lower cross member 362 extends between land portion 347 on the auxiliary side plate 34 and the lowermost end of the side plate 32 and is bolted in place at each of these positions. Cross members 360 and 361 are shaped as shown in FIG. 10 to increase their strength while providing clearance for segment gears 40, 42, 52 and 54.

The lower cross member 362 pivotally supports one end of the W3 actuator 80 (described below) at centreline 'A' (FIG. 10) and provides additional cross bracing of the side plates 32 and 34 whilst allowing the accommodation of the gears and the pivotal movement of the wrist mechanism to its kinematic extremities. It will be seen that the satisfaction of these requirements necessitates a complex shape for the cross member 362 which is face mounted to side plate 34 and end mounted to side plate 32 with the central portion cut away at 364 (FIG. 11) to accommodate the bevel gear 60 with a matching relief in the end bracket 362 as illustrated in FIG. 10. A further relief shown at 365 (FIG. 9) is provided to clear bevel gear 58 while the external taper opposite to 365 is to clear the rim of segment gear 54. Slotted reliefs 54A, one of which is visible in FIG. 11, are provided in the web of segment gear 54 to match with the relief shown at 363 to permit a ±83.3° oscillation of segment gear 54 which must overlap cross bracket 362 from either side to the centreline of bracket 362 within the region of 363 in order to provide a 180° range of movement on the W3 axis.

FIGS. 10 and 11 show that the W2 and W3 segment gears 52,54 and 40,42 are shaped to provide the required freedom of movement and strength with as little addition to the mass of the wrist as is possible. It will be appreciated that further weight reductions could be made to various parts of the assembly, particularly the main and second side plates.

As shown in FIGS. 9 and 11, bevel gears 50, 58 and 48,60 are similarly machined to permit free movement and to save weight with gears 50,52 having only 11 teeth.

Figure 7:
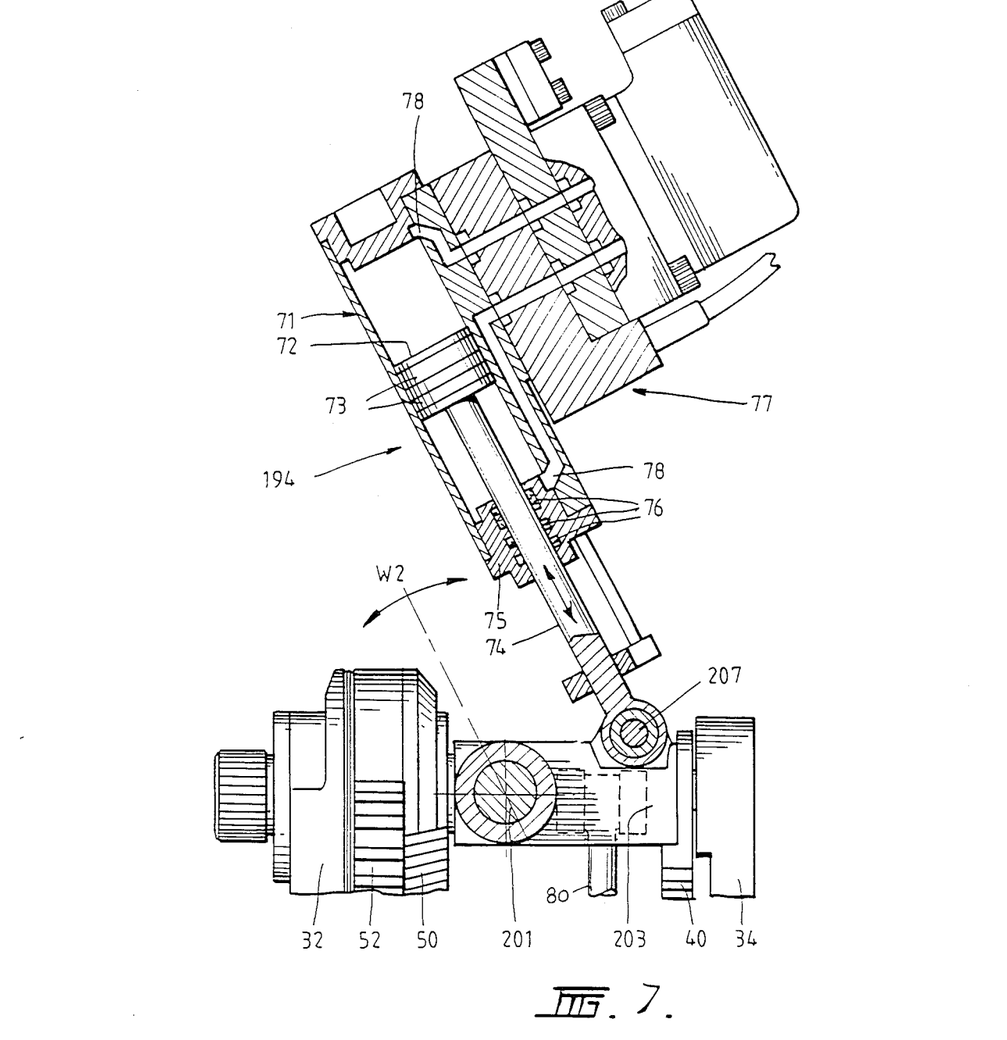

Referring now to FIGS. 2 and 7 of the drawings, hydraulic actuator 194 for rotation of the wrist mechanism about its W2 axis will be seen to comprise a cylinder 71 housing a piston 72 carrying seals 73. The piston 72 has a piston rod 74 passing through a nose cap 75 carrying seals 76. To avoid the need for flexible hose connections and thereby reduce the volume of hydraulic fluid between the control valve and the piston, and hence increase the actuator stiffness, the cylinder 71 carries a servo-valve assembly 77 which controls the supply of hydraulic fluid to the cylinder 71 via passages 78. The piston rod 74 is pivotally attached to the pivot pin 207 on the upper pivot shaft 203 and therefore operates to pivot the wrist assembly 10 in the direction to the arrows labelled W2 movement about the axis of the cross shaft 201.

Referring to FIGS. 7 to 10, the wrist will be seen to house a further hydraulic actuator 80, mounted internally of the wrist mechanism 10 between the side plates 32 and 34. The cylinder of the hydraulic actuator 80 is pivoted at its lower end to the lower cross member 362 (FIG. 10) about axis 'A', and has its piston rod pivoted to the pivot pin 208 on the upper pivot shaft 203. The actuator 80 is similar in construction to the actuator 194 and similarly carries a servo-valve assembly 81 to reduce the volume of hydraulic fluid between the control valve and the piston and to increase the actuator stiffness. Operation of the actuator 80 causes the wrist 10 to pivot about the axis of the upper pivot shaft 203, as indicated by the arrows in FIG. 11 labelled W3 movement.

Figure 14:
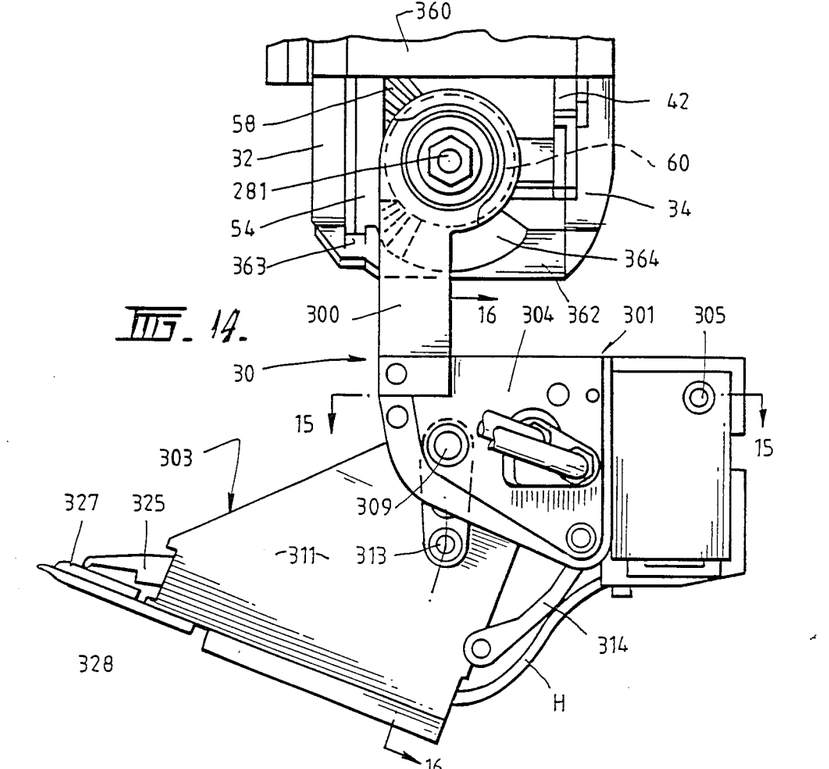
FIG. 14 is a side elevation of the follower and cutter assembly of the wrist mechanism.
Figure 15:
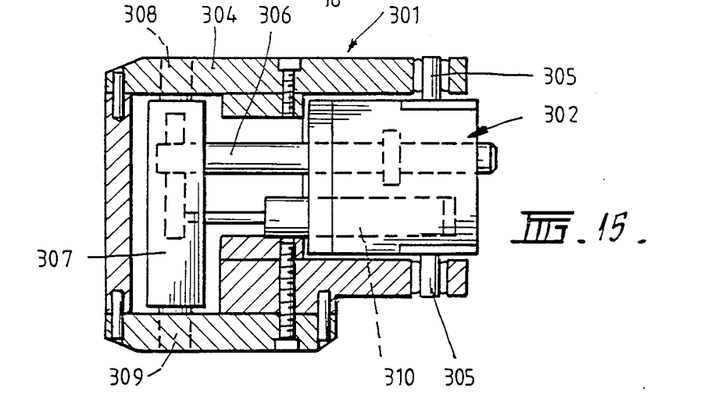
FIGS. 15 and 16 are sectional views of the follower and cutter assembly taken along the lines 15—15 and 16—16 of FIG. 14.
Figures 16, 17:
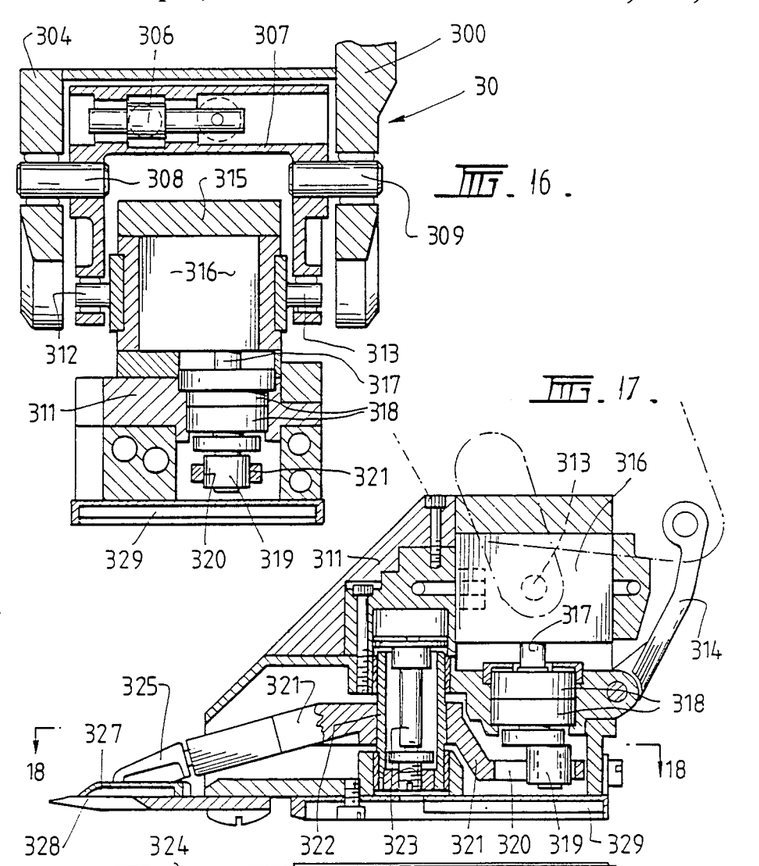
FIG. 17 is a central longitudinal sectional side elevation of the follower and cutter assembly.
Figure 18:
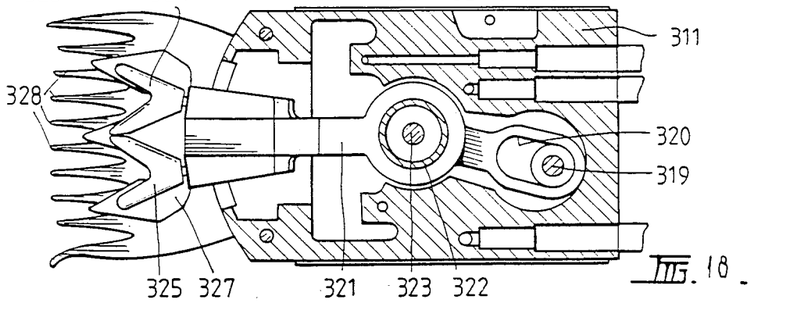
FIG. 18 is a sectional plan view taken along the line 18—18 in FIG. 17.

Referring now to FIGS. 2 and 14 to 16, the lower yoke assembly 30 includes a follower mounting arm 300 rigidly fixed to the bevel gear 60 (FIGS. 14 and 16). The mounting arm 300 carries a follower assembly 301 which includes an hydraulic actuator 302 (FIG. 15) by means of which a cutter assembly 303 (FIGS. 14 and 15) is pivoted about the follower assembly. The actuator 302 is pivoted to the casing 304 of the follower assembly by pivot pins 305 and the piston rod 306 of the actuator 302 is attached to a follower yoke 307 pivoted to the casing 304 by pins 308 and 309 mounted in needle roller bearings. A potentiometer 310 is provided to sense the position of the yoke 307. Hydraulic service lines H supply hydraulic fluid to the actuator 302 and the electrical service lines E are attached to the potentiometer 310 and to the other sensing mechanisms carried by the cutter to be described below.

As shown in broken outline in FIGS. 14 and 15, a cutter assembly 311 is pivoted to the follower yoke 307 via pivots 312 and 313 (FIG. 16) housing needle roller bearings, and by a rear pivot link 314 (FIG. 17). The cutter assembly 311 includes a housing 315 which encloses an hydraulic motor 316, the output shaft 317 of which is coupled via bearings 318 to a drive crank 319. The crank 319 engages an oval opening 320 in a rocker shaft 321 mounted for oscillatory motion on a hollow vertical shaft 322 which houses an adjustable tension post 323. The rocker shaft 321 terminates in pivotally mounted chickens feet 324 and 325 which engage cutters 327 in contact with a shearing comb 328.

The cutter assembly 311 carries a capacitive position sensor 329 (which is described more fully in our co-pending Patent Applications Nos. AU-A 81956/87 filed on 30th Nov. 1987 and AU-A 32064/84 filed on 17th Aug. 1984), a motor speed sensor (not shown) and other sensors which enable the position and orientation of the cutter assembly 311 to be controlled by means of the actuator 302 and the wrist mechanism 10. The operation of the wrist mechanism 10 and the cutter is controlled by a programmed controller to automatically shear a sheep by means of the cutter assembly 311. Since the controller and its operation does not form part of this invention, it will not be described in any further detail in this specification. However, it will be appreciated that such control of the position of the cutter assembly 311 requires the position of each part of the mechanism to be accurately known at all times and to this end potentiometers and other position sensors are provided in association with each of the actuators 120, 194 and 80, and of course actuator 302, as already described.

We claim:

1. A wrist mechanism suitable for robotic manipulators comprising first actuator means for rotating a first yoke about a first axis (W1), a first cross shaft, one shaft of which is mounted for rotation in bearings carried by arms of said first yoke, the other shaft of which has its ends mounted in bearings carried by a pair of spaced parallel side plates, second actuator means for pivoting said first cross shaft in said bearings about a second axis (W2), a second cross shaft having one shaft mounted in bearings carried by said side plates, the other shaft of which pivotally carries a second yoke adapted to carry an end effector, third actuator means for causing rotation of said wrist mechanism about a third axis (W3) coincident with the axis of said other shaft of said first cross shaft, cross members rigidly interconnecting said side plates, and gear means for transferring motion between said first cross shaft and said second cross shaft and for transmitting drive between said first yoke and said second yoke, whereby said third actuator means causes simultaneous rotation about said third axis and about an axis parallel to the axis of said second cross shaft said side plates, said cross members, said bearings and said gears being constructed and adjusted to provide high rigidity in said wrist mechanism, said side plates and said cross members being of such a configuration to allow pivotal movements of the end effector in excess of 180° about said second axis and at least 180° about said third axis, said first actuator being constructed to allow rotation in excess of 200° about said first axis.

2. The wrist mechanism of claim 1, wherein said spaced side plates include one very rigid bearing carrying side plate and a lighter bearing carrying side plate interconnected by two intermediate cross members and a lower cross member shaped to allow free passage of the gears throughout the full range of motion of the wrist mechanism and also to accommodate the third actuator means between the side plates within the mechanism.

3. The wrist mechanism of claim 2, wherein said gear means for transferring motion between said first and second cross shafts are mounted on substantial bearing assemblies carried by first and second bearing holders formed integrally with the very rigid side plate, and the meshing of the bevel gears is adjusted by means of machined spacer washers to reduce the amount of backlash to a minimum thereby further improving the rigidity of the mechanism.

4. The wrist mechanism of claim 3, wherein said bevel gears are carried on said bearing holders.

5. The wrist mechanism of claim 1, wherein said actuators are hydraulic actuators having servo valves mounted directly on said actuators to reduce to a minimum the volume of hydraulic fluid carried by the hydraulic actuators thereby reducing the compliance of the wrist mechanism.

6. The wrist mechanism of claim 5, wherein the actuator for the W3 movement is carried inside the wrist mechanism thereby reducing the overall dimensions of the wrist mechanism.

7. The wrist mechanism of claim 1, further comprising service and signal lines extending from said first yoke to said end effector, said lines extending from one face of said yoke and entering a face of said end effector displaced by about 90° to said one face of said yoke whereby said service and signal lines do not become entangled and do not encroach on the work space of the end effector.

8. The wrist mechanism of claim 3, wherein said first yoke includes a main pivot arm to which a first bevel gear is rigidly attached and through which a cross shaft is mounted in bearings, said cross shaft being rigidly mounted in an opening in an upper pivot shaft mounted in said bearings carried by said first bearing holder of said very rigid side plate and in bearings in said lighter side plate, a second bevel gear meshing with said first bevel gear and carried by bearings engaging the external surface of said first bearing holder, said second bevel gear also carrying a first segment gear extending adjacent and parallel to said very rigid side plate, a second segment gear meshing with said first segment gear and carried by a third bevel gear mounted on bearings engaging the outer surface of said second bearing holder, a lower pivot shaft carried by the bearings in said second bearing holder and in said auxiliary side plate, a stub axle rigidly carried in an opening in said lower pivot shaft and extending perpendicularly thereto, said stub axle carrying a bevel gear which meshes with said second bevel gear, third and fourth segment gears carried by said upper and lower pivot shaft and extending parallel to said lighter side plate, said second actuator means being mounted on said first yoke and engaging pivot means attached to said upper pivot shaft to pivot said wrist mechanism about an axis coincident with said cross shaft, said third actuator extending between said lower cross member and pivot means on said upper pivot shaft to pivot said wrist mechanism about an axis coincident with said upper pivot shaft, said second yoke being rigidly attached to said fourth bevel gear.

* * * * *